United States Patent
Kaufman et al.

(10) Patent No.: US 11,092,119 B1
(45) Date of Patent: Aug. 17, 2021

(54) VIEWING PORT FOR AN AIRBOX ON AN INTAKE TUBE

(71) Applicant: S&B Filters, Inc., Fontana, CA (US)

(72) Inventors: Josiah J. Kaufman, Fontana, CA (US); Pilun Alan Chen, Fontana, CA (US)

(73) Assignee: S&B FILTERS, INC., Fontana, CA (US)

( * ) Notice: Subject to any disclaimer, the term of this patent is extended or adjusted under 35 U.S.C. 154(b) by 37 days.

(21) Appl. No.: 16/401,014

(22) Filed: May 1, 2019

(51) Int. Cl.
| | |
|---|---|
| *F02M 35/024* | (2006.01) |
| *F02M 35/16* | (2006.01) |
| *B60K 13/02* | (2006.01) |

(52) U.S. Cl.
CPC ........... *F02M 35/024* (2013.01); *B60K 13/02* (2013.01); *F02M 35/16* (2013.01)

(58) Field of Classification Search
CPC ....... F02M 35/024; F02M 35/16; B60K 13/02
USPC .................................................... 123/184.21
See application file for complete search history.

(56) References Cited

U.S. PATENT DOCUMENTS

| | | |
|---|---|---|
| 701,101 A | 5/1902 | Stutz |
| 2,346,495 A | 4/1944 | Lingel |
| 2,848,130 A | 8/1958 | Jesnig |
| 3,136,440 A | 6/1964 | Krug et al. |
| 3,187,966 A | 6/1965 | Klygis |
| 3,362,556 A | 1/1968 | Waldrum |
| 4,724,624 A | 2/1988 | Duclos |
| 5,379,907 A | 1/1995 | Niedospial et al. |
| 5,511,518 A | 4/1996 | Jain et al. |
| 5,662,095 A | 9/1997 | Matsuo |
| 6,766,782 B1 | 7/2004 | Martin |
| 6,845,877 B2 | 1/2005 | Diesterbeck |
| 7,631,630 B2 | 12/2009 | Sedlar et al. |
| 7,765,970 B2 | 8/2010 | Sammons |
| D624,092 S | 9/2010 | Holmer |
| 8,813,991 B1 | 8/2014 | Liu |
| 9,145,231 B2 | 9/2015 | Furlong |
| 9,340,330 B2 * | 5/2016 | LeBoeuf ............ B65D 43/0208 |
| 9,394,083 B2 | 7/2016 | Cote, Sr. et al. |
| 2006/0260469 A1 | 11/2006 | Miyagishima et al. |

(Continued)

FOREIGN PATENT DOCUMENTS

WO    WO2013167436 A1    11/2013

OTHER PUBLICATIONS

Jun. 2016 printout from sbfilters.com webpage from archive.org.

*Primary Examiner* — Lindsay M Low
*Assistant Examiner* — Omar Morales
(74) *Attorney, Agent, or Firm* — Stetina Brunda Garred and Brucker; Mark B. Garred

(57) ABSTRACT

A cover for an air filter housing of a motor vehicle has a clear cover with a gasket having a first channel enclosing an outer periphery of the cover. The gasket has a second channel configured to receive an inwardly extending flange on the air filter housing which flange extends around a viewing opening in the housing. The gasket has an end portion connected to the second channel that is inwardly and downwardly inclined to allow the end portion to slip over the flange and form a snap lock with the flange retaining the gasket and cover over the opening in the air filter housing. The end portion has a downwardly inclined edge below the flange, so the cover and gasket can be removed from the housing by pulling on a pull tab extending from the gasket.

24 Claims, 5 Drawing Sheets

(56) References Cited

U.S. PATENT DOCUMENTS

2011/0167776 A1* 7/2011 Gorg .................... B01D 46/521
                                                                                     55/493
2013/0025557 A1* 1/2013 Chlystek .............. F02M 35/164
                                                                                    123/184.21

* cited by examiner

VIEWING PORT FOR AN AIRBOX ON AN INTAKE TUBE

CROSS-REFERENCE TO RELATED APPLICATIONS

Not applicable.

STATEMENT RE: FEDERALLY SPONSORED RESEARCH/DEVELOPMENT

Not Applicable

BACKGROUND

Air filters remove dust, particles and debris from the air used to combust gasoline in internal combustion engines. The air filter may be contained in a filter housing to shield the filter from heat, water, larger size debris and physical damage, while allowing air to enter the filter housing and pass through the filter contained in that housing. The filter housing is typically mounted to the engine or to a vehicle body, underneath the vehicle's hood. When the filter housing is mounted off the engine then an air intake tube couples the filter housing to the engine. The filter housing is sometimes referred to as an air-box.

As the dust and materials blocked by the air filter accumulate on the filter's outer surface the air flow through the filter is reduced, so the filters need to be checked periodically to see if they need cleaning. There is thus a need to access the air filters inside the housing. Inspection of the air filter may be visual, or may require removal and physical inspection. Access to the filter for inspection usually requires removal of all or substantial portions of the filter housing, which may be time consuming, especially if the housing is difficult to access. There is thus a need for an air filter housing that allows easier access to check the filter within the housing.

One filter housing sold by S&B Filters, Inc. has a transparent viewing port fastened over an opening in one side of the filter housing. While this allows visual inspection, it does not facilitate physical inspection because the viewing port is fastened to the housing with screws and removing the screws to access the filter is time consuming. Screws may also be misplaced, dropped into the engine or lost, as may the screwdrivers needed to remove and install the screws. Moreover, the screws holding the viewing port to the filter housing may provide an uneven seal between the viewing port and the filter housing along the periphery of the viewing port, allowing hot engine air, dust, engine vapors and water to be sucked into the filter housing and altering the flow of air through the filter housing to the filter. Hotter air from the engine area is less desirable for combustion and the oil vapors and fuel vapors under the engine can clog the air filter and shorten its life. Moreover, the prior viewing port was fastened to the housing by screws through holes in the cover and resulted in cracking the cover at the location of the fasteners, thus risking breakage of the cover and uncontrolled entry of engine air into the filter housing. There is thus a need for an improved filter housing for use with air intakes of motor vehicles that makes it easier to inspect the air filter visually and physically, and to do so quickly, with few tools and without separable parts that may be misplaced or lost.

BRIEF SUMMARY

An assembly for an air filter housing of a motor vehicle has a clear cover with a gasket having a first channel enclosing an outer periphery of the cover. The gasket has a second channel configured to receive an inwardly extending housing flange on the air filter housing which flange extends around a viewing opening in the housing. The gasket has an end portion connected to the second channel and an inclined side of that end portion is inwardly and downwardly inclined to allow the end portion to slip over the flange and form a snap lock with the housing flange retaining the gasket and cover in place over the opening in the air filter housing. Sliding the inclined side of the end portion past the housing flange is made easier by bending the end portion inward. The second channel has a lower channel wall that is inclined downward and outward, so the end portion of the gasket can slide upward over the housing flange and that sliding is helped by the end portion bending inward.

As used herein, the following part numbers generally refer to the following parts 10—air intake assembly; 11—longitudinal axis; 12—air intake tube; 14—upstream end; 16—downstream end; 18—filter housing; 20—air filter; 21—cover assembly; 22—transparent cover; 24—gasket; 26—walls of filter housing; 28—opening in filter housing; 30—mounting bracket(s); 32—opening in wall 26; 34—air inlet; 36—pre filter; 38—outlet end of filter; 40—first channel of gasket; 41—flange; 42—second channel of gasket; 43—rim; 44—triangular end portion of gasket; 46—first horizontal gasket segment; 48—second horizontal gasket segment; 50—first vertical gasket segment; 52—second vertical gasket segment; 54—vertical and inward facing side of end portion of gasket; 56—pull tab; and 58—recess in cover.

In more detail, a cover assembly is provided to cover an opening in an air filter housing for a motor vehicle. The housing has housing walls forming an enclosure for containing an air filter. The housing walls may form an open top encircling a longitudinal axis extending through a center portion of the open top. The housing walls have and an inwardly extending housing flange extending around a periphery of that open top. The housing flange extends inward toward the longitudinal axis a distance L measured along a length of the housing flange. The housing walls have a top edge which may be at the location of the housing flange, or located above the housing flange. The cover assembly includes a cover and a gasket.

The cover advantageously has a shape configured to correspond to the shape of the housing flange and to rest against the housing flange along at least a majority of the peripheral length of the flange during use. The cover advantageously has at least a portion that is transparent and preferably transparent across the entire cover. The cover has opposing top and bottom sides and a peripheral edge.

The gasket is advantageously made of elastomeric material and may include a first channel opening toward the longitudinal axis and containing a portion of the top and bottom sides of the cover around the peripheral edge of the cover. The gasket advantageously has a second channel below the first channel and the second channel opens in a direction away from the longitudinal axis and preferably opposite the direction of the first channel. The second channel is advantageously sized to receive the housing flange during use of the cover assembly. The second channel has second channel top and bottom walls with the second channel bottom wall inclined outward and downward at an angle of 3° to 15°. A second channel end wall extends between top and bottom walls of the second channel, at the interior end of the second channel. The gasket also advantageously has a lock portion with a top side formed by the second channel bottom wall and an inclined side that faces downward and outward and extends around a periphery of the gasket at the second channel bottom wall. The inclined side is sized and located to hit the inward end of the housing flange around a periphery of the housing flange when the cover and gasket are moved along the longitudinal axis during use to connect the cover and gasket to the housing flange and housing. The second channel end wall connects to the lock portion and forms a hinge that allows the lock portion to bend inward and outward relative to the longitudinal axis. That bending helps the outward and downwardly inclined wall of the lock portion to slide downward over the housing flange, and helps the second channel bottom wall (which forms the top side of the lock portion) to slide upward over the housing flange.

In further variations of the cover assembly, the first channel top wall is parallel to the first channel bottom wall and joined thereto by a first channel end wall. The second channel may have a second channel top wall formed by a gasket segment that forms the first channel bottom wall. The lock portion may have a triangular cross-sectional shape with a third side extending downward (preferably vertically) from the second channel end wall and cooperating with the second channel end wall to form a cylindrical surface encircling the longitudinal axis during use. As the second channel end wall bends similar to a hinge, part of this cylindrical surface also bends inward and outward relative to the longitudinal axis. Advantageously, the gasket has an S-shaped cross section with the first and second channels opening in opposing directions, and with the first channel opening toward the longitudinal axis and the second channel opening in a direction away from the longitudinal axis. The first channel top wall and the second channel top wall are orthogonal to the longitudinal axis and that configuration is believed especially useful for flat covers or covers with curved portions but flat (e.g., planar or horizontal) peripheral lips.

There is also advantageously provided an air inlet assembly for a motor vehicle. The assembly includes an air filter housing having housing walls defining an enclosure for an air filter for a motor vehicle. The housing walls define at least one air inlet opening and further define a viewing opening. The viewing opening has an outer periphery surrounded by a rim of the housing walls. The housing also has a housing flange extending inward toward a longitudinal axis extending out of a center portion of the viewing opening. The housing flange advantageously extends around at least a majority of the viewing opening, and preferably extends around a substantial portion of the housing that equals or exceeds 90% of the viewing opening.

The air inlet assembly advantageously includes a cover assembly having a transparent cover configured to extend over the flange, and a gasket to hold the cover to the housing, over the viewing opening. An outer periphery of the cover may be enclosed in a first channel of a gasket, which channel advantageously opens inward toward the longitudinal axis. The gasket advantageously has a second channel opening outward from the longitudinal axis and containing the housing flange, so the cover and gasket block the viewing opening. The second channel has upper and lower second channel walls on opposing sides of the housing flange. The upper and lower second channel walls are joined by a second channel end wall to form a U-shaped cross-section. The gasket advantageously has a bottom portion (preferably having a triangular cross-section) with an inclined side facing downward and also outward toward the housing and inclined at an angle sufficient to allow the inclined side to pass over the housing flange as the gasket bends inward at the second channel end wall when the gasket and cover move along the longitudinal axis toward the housing. The lower side of the second channel wall is advantageously angled downward away from the housing flange at an angle sufficient to allow the lower side of the second channel to pass upward over the housing flange when the cover assembly is manually removed from the viewing opening. The lower side of the second channel wall is advantageously the top side of the bottom portion of the gasket so the same surface has two different names.

In further variations of the assembly, the air inlet assembly has the housing flange extend inward from the rim of the housing walls. Alternatively, a portion of the housing wall may extend above the housing flange with the rim of the housing walls located a distance "d" above the housing flange, so that an axial thickness of the periphery of the cover assembly is the same as or less than that distance "d" and the cover can rest on the flange and not protrude above the rim of the housing. In further variations, the outer periphery of the gasket at the first channel end wall does not extend beyond the rim of the housing defining the viewing opening. Moreover, the outer periphery of the gasket at the first channel end wall may extend beyond the outer periphery housing walls at the juncture with the housing flange. The housing flange may extend around a substantial portion of the periphery of the viewing opening.

In further variations of the air inlet assembly, the assembly includes an air filter in the air filter housing, with the air filter being visible through at least a portion of the cover and preferably visible through all of the cover not enclosed by the gasket. The air inlet assembly may also include an air intake tube connected to one of the air filter housing or the air filter. The air intake tube may advantageously be in fluid communication with an engine of the motor vehicle, and may be in communication with an inlet port of a supercharger manifold, or turbocharger, or throttle body There is also provided an air inlet assembly for a motor vehicle that includes an air filter housing and a cover assembly and other optional items. The air filter housing advantageously has walls defining an enclosure for an air filter. The enclosure has at least one air inlet opening and a viewing opening with a rim around an outer periphery of the viewing opening. The housing has a housing flange extending inward toward a longitudinal axis extending out of the viewing opening. The housing flange advantageously extends around at least a majority of the viewing opening, and preferably extends around a substantial portion of the viewing opening.

The cover assembly advantageously has a transparent cover configured to extend over the flange and a gasket having a first channel facing the longitudinal axis and holding an outer periphery of the cover with a bottom side wall of the first channel interposed between the cover and the housing flange. The gasket advantageously has a second channel facing away from the longitudinal axis and containing the housing flange to hold the cover assembly to the housing flange. The second channel may have upper and lower side walls on opposing sides of the housing flange that are joined by a second channel end wall which bends inward and outward relative to the longitudinal axis like a hinge to allow the gasket to pass the housing flange when an inclined side of the gasket that faces outward toward the housing and downward, slides over the housing flange as the gasket bends inward at the second channel end wall when the inclined side of the gasket is forced past the housing flange.

In further variations, this air inlet assembly has the lower side of the second channel angled downward and away from the housing flange at an angle of 3° to 15°. The air inlet assembly advantageously has the housing flange extending around a substantial portion of the viewing opening. The assembly advantageously further includes an air filter in the air filter housing which filter is visible through at least a portion of the cover, and also an air intake tube having a first end connected to one of the air filter housing or the air filter.

The several variations on the cover assembly and air inlet assemblies described above and later in this disclosure, may be used in any combination. These combinations include a cover that is domed or curved in a direction along the longitudinal axis.

BRIEF DESCRIPTION OF THE DRAWINGS

These and other advantages and features of the invention will be better appreciated in view of the following drawings and descriptions in which like numbers refer to like parts throughout, and in which.

DETAILED DESCRIPTION

As used herein, the relative directions up and down, above and below, top and bottom, are with respect to directions along the vertical axis, with the parts in the orientation as shown in FIGS. 3-6. L The relative terms inner and outer, inward an outward, are with respect to an air filter housing longitudinal axis 11 through the center portion of the viewing cover, when that cover faces vertically, and the longitudinal axis extends vertically. Because the shape of the cover can vary, the exact center of the cover may be difficult to locate and thus the reference is to an axis through the center portion, but the directions relative to the longitudinal axis will be substantially the same whether the axis is through the exact center or the center portion. As used herein, a majority or a major portion means over 50% while a substantial portion means 90% or more.

Figure 1:
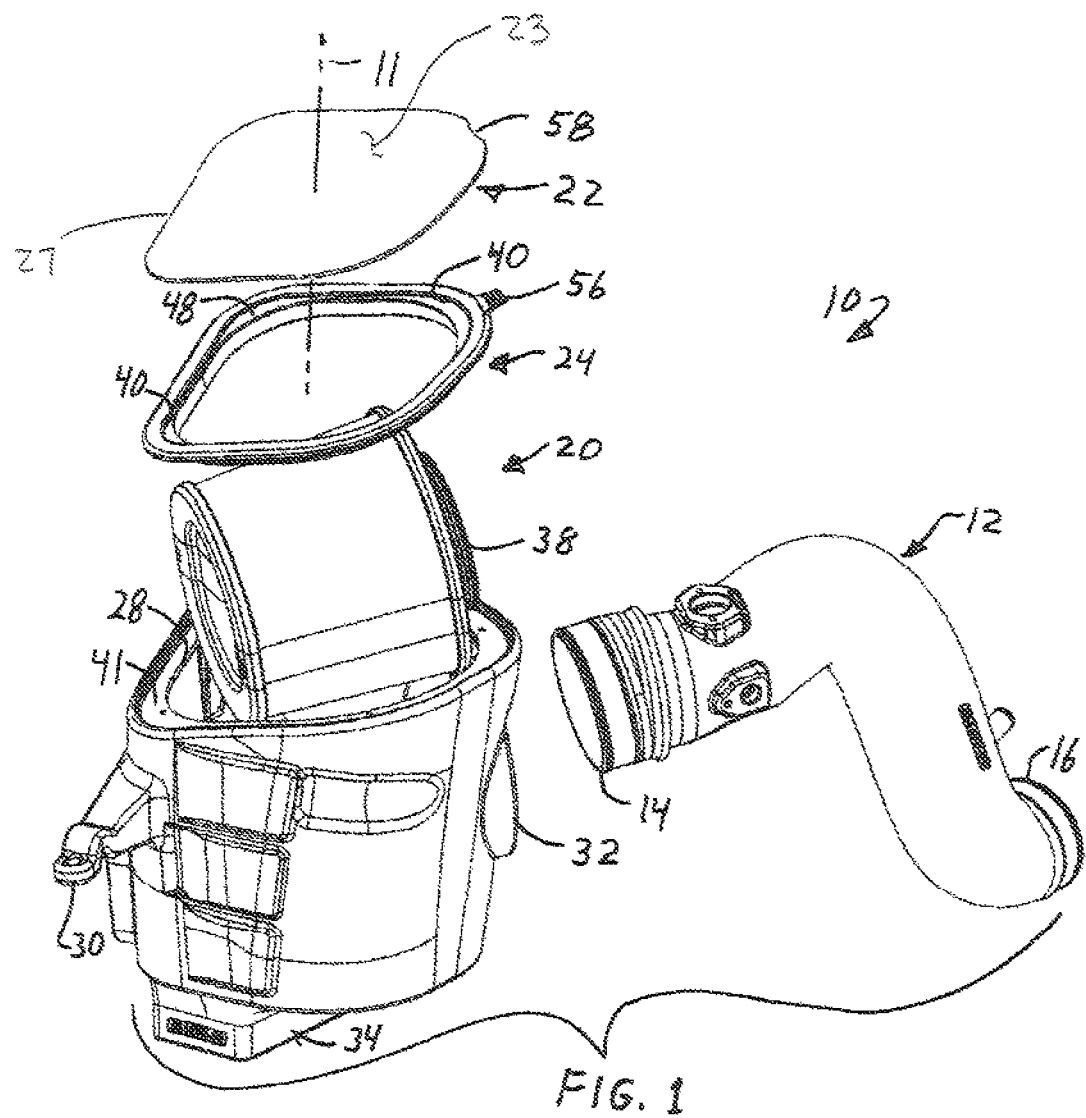
FIG. 1 is an exploded perspective view of an air intake assembly having a filter housing assembly and an air intake tube connected directly to the air filter.
Figure 2:
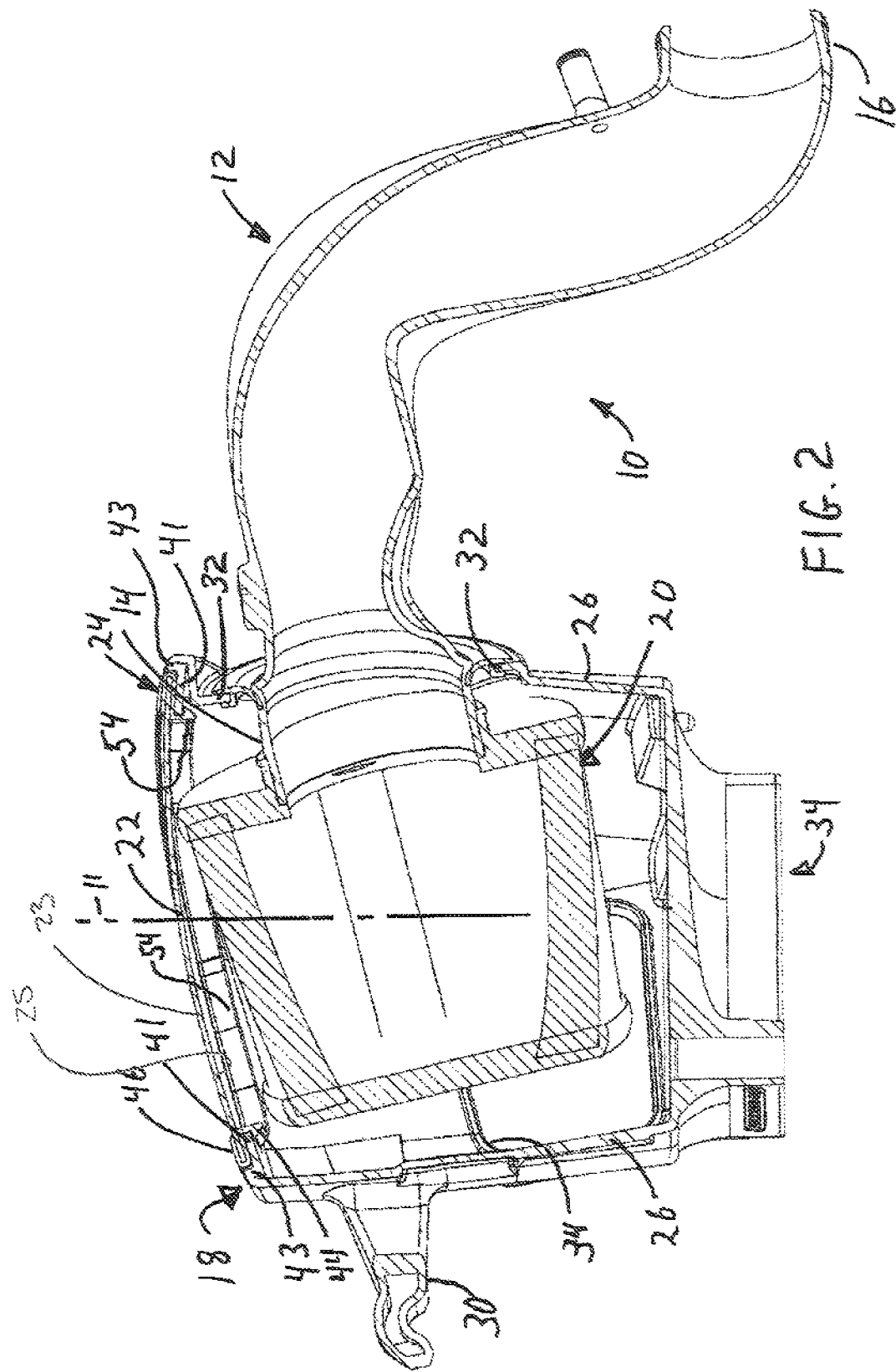
FIG. 2 is a cross-sectional view of the air intake assembly of FIG. 1 in an assembled configuration with the air intake tube connected to the air filter inside the housing.

Referring to FIGS. 1-2, an air intake assembly 10 has an air intake tube 12 with a second end 16 configured to connect to an engine, usually an engine of a motor vehicle, and often to a turbo charger or throttle body. The intake tube 12 has opposing, first end 14 configured to fasten to a downstream end of an air filter housing 18 containing an air filter 20 or to fasten directly to the air filter itself. The air filter housing 18 has a removable cover assembly 21 with a viewing cover 22 contained in a sealing gasket 24 that extends around a periphery of the viewing cover, with at least a portion of the cover 22 being transparent to view the air filter through the viewing cover 22. As seen in FIGS. 1 and 2, the cover 22 has opposing top and bottom sides 23, 25, and a peripheral edge 27. The filter housing 18 has a plurality of walls 26 enclosing the filter 20, with an opening 28, usually on the top or upper portion of the air filter housing 18 blocked by the viewing cover 22. The walls 26 may include a bottom wall or top wall and may include a continuously curved sidewall encircling the longitudinal axis 11. In FIG. 1, the opening 28 comprises an open top of the filter housing 18, but it could comprise a smaller opening in any of the walls 26. The opening 28 and viewing cover 22 are advantageously located on a portion of the housing 18 that is visible during use of the air filter 20 and that is also preferably readily accessible, with cover and gasket assembly removably fastened to an opening 28 in one portion or one side of the filter housing 18.

The shape of the filter housing 18 varies depending on the shape and size of the air filter 20, the location of the filter housing in the engine compartment or elsewhere on the motor vehicle, and the space available to accommodate the filter housing. The location of viewing cover 22 is preferably on a top side of the filter housing 18 and adjacent the vehicle hood or engine cover so the viewing cover it is readily accessible during use. But the viewing cover may be located elsewhere, depending on the location of the air filter.

The filter housing 18 may have one or more mounting brackets 30 configured to connect to a portion of a motor vehicle body (not shown) to hold the filter housing in position relative to the vehicle. The location and configuration of the mounting brackets will vary. The filter housing 18 has an opening 32 in one of the walls 26, sized to receive or connect to the upstream end 14 of the intake tube 12. As the intake tubes 12 are typically circular in cross-section, the opening 32 is typically circular, but other shapes may be used.

In the depicted embodiment the air intake tube 12 passes through the opening 32 in the housing 18, and connects directly to the outlet end 38 of the air filter 20. Typically, the inlet end or upstream end 14 forms a snap-fit engagement with the outlet end 38 of the air filter 20 or is clamped to the air filter 20 or otherwise connected using various connections known in the trade. An appropriate sealing gasket or connection mechanism may be provided to connect the upstream end 14 of the intake tube to the opening 32 in the wall 26 in an air-tight manner suitable for such connections as in FIG. 2. The connection seals the intake tube 12 to the housing 18 so that during use air enters the housing through the inlet 34 (located in the bottom of the housing in the depicted embodiment).

The filter housing 18 in FIG. 2 shows a center support rib in cross-section, with air inlet openings 34 on opposing sides of the support rib. In the depicted embodiment air also enters through a generally rectangular opening 34 in the lower left portion of FIG. 2. The inlet or inlets 34 to the air filter housing 18 will vary with the location of the air filter housing under the vehicle's hood. The air inlets 34 are preferably located to draw cooler, fresh air rather than to draw hotter air from around the engine. Thus, the air inlets are advantageously located to draw air from such locations as the fender or wheel well or possible from below the bumper. Thus, the location and configuration of the air inlet openings 34 on various walls of the housing may vary. Air enters the air intake tube 12 only after passing through the air filter 20. An optional pre-filter may cover the opening(s) 34. The optional pre-filter may include a screen filter to limit the size of particles entering the filter housing.

The air filter 20 has a downstream end or outlet end 38 coupled to the upstream end 14 of the inlet tube 12, preferably in an air tight manner suitable for these applications. Advantageously, the inlet tube's inlet end 14 extends through opening 32 in the filter housing and seals with the outlet end 38 of the air filter 20, so the inside of the air filter is in fluid communication with the engine through the air intake tube 12. Referring to FIG. 2, when the inlet end 14 of the air intake tube 12 is connected directly to the air filter 20, a suitable seal is advantageously provided between the opening 32 in the housing 18 through which the air intake tube passes, and the air intake tube, so that air does not enter the air filter housing around the inlet tube as it passes through the wall(s) of the housing 18, Thus, a suitable seal may be provided between the air intake tube adjacent the inlet end of that tube, and the air filter housing.

The upstream end 14 of the air intake tube 12 may connect to the air filter housing 18, with the air filter 20 also connecting to the housing. In such configurations, the housing advantageously has an outwardly extending lip to which the upstream end 14 connects adjacent to, but outside of, the air filter housing 18. The housing 18 also has an inwardly extending lip to which the downstream end or outlet end 38 of the air filter 20 connects. The two lips on the housing form a fluid coupling to place the air filter 20 inside the housing 18 in fluid communication with the air intake tube 12, outside the housing. Advantageously, the two lips are on the same housing wall so that wall effectively holds a tube with the air inlet tube connected to an outer end and the air filter connected to an inner end of the tube. The connections can be by hose clamps, snap fittings or other connections known in the relevant art.

Referring to FIGS. 2-5A, the air filter housing walls 26 defining the opening 28 in the air box have an inwardly extending housing flange 41 adjacent a top edge of the housing wall forming that opening 28. The housing flange 41 has opposing top and bottom sides and an inward end 49, and usually extends laterally when the cover is flat, but could be inclined upward if the cover 22 is curved or if the outer periphery of the cover is inclined or curved. A housing rim portion 43 extends upward from the inward housing flange 41 to the rim of the housing defining the opening 28. The gasket 24 fits around the peripheral edge of the cover 22 and has a first channel 40 with a U-shaped cross section. The first channel 40 is sized to receive that peripheral edge 27 of the viewing cover 22, with the open-ends of the first channel 40 facing inward, facing toward each other. The gasket 24 has a second channel 42 below the first channel 40, with the second channel 42 having a generally U-shaped cross-section and sized to receive the inward extending flange 41 on the housing walls 26. Extending below the second channel 42 is an inwardly tapered, lock portion or end portion 44 having a generally triangular, cross-sectional shape, with a top side 45, an inwardly and downwardly inclined side 47, and a generally vertical inward facing side 54 in the orientation shown in FIGS. 3-6. The top side 45 also defines a second channel bottom wall of the second channel 42 which, as seen in FIGS. 5A-6B, is inclined slightly downward and outward. The actual orientation of the parts of the gasket 24 will vary during use because the cover may be inclined at skew angles to the horizontal ground plane and the two orthogonal vertical planes.

Figure 4:
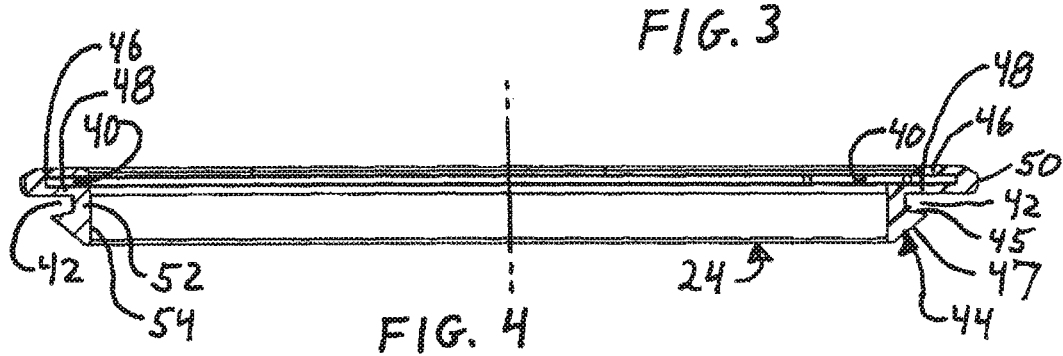
FIG. 4 is a sectional view taken along section 4-4 of FIG. 3.
Figure 5A:
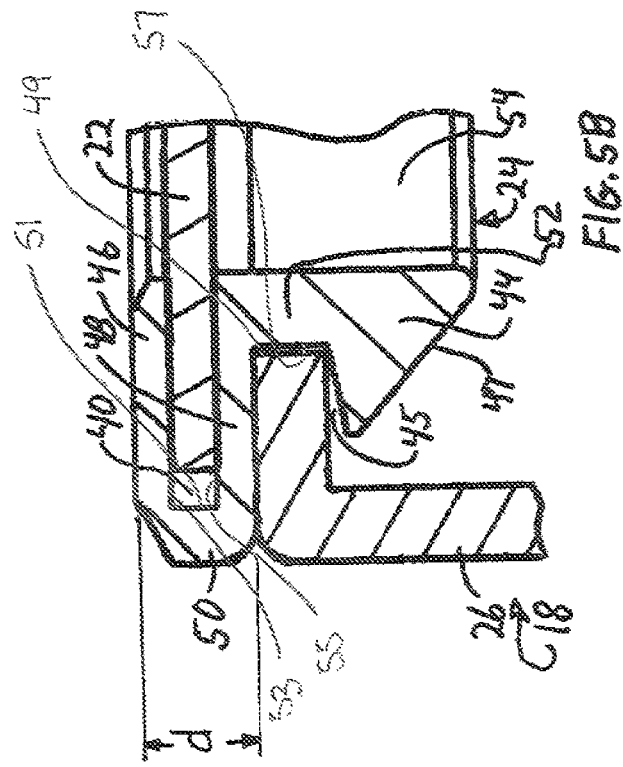
FIG. 5A is a sectional view showing the cover connected to an air filter housing having an inward extending flange and an upward rim portion on the air filter housing.

Referring to the orientation of the gasket shown in FIGS. 4 and 5A, the gasket 24 has a generally S-shaped cross-sectional shape with first and second, generally parallel and horizontal segments 46, 48, first and second generally vertical segments 50, 52, and the triangular end portion 44. The first segment 46 is above and parallel to the second segment 48, which is above the top side 45 of the end portion 44. The first channel 40 has a U-shaped cross-section that opens inward. The first channel 40 is formed by the first and second horizontal segments 46, 48 joined by the first vertical segment 50 that forms an end-wall 51 to the first channel, at the outer end of each horizontal segment 46, 48. The first segment 46 forms a first channel top wall 53 of the first channel 40 and the second segment 48 forms a first channel bottom wall 55 of the first channel 40.

The second channel 42 has a U-shaped cross-section that opens outward, formed by the second horizontal segment 48 and the top of the triangular end portion 44, both joined by the second vertical segment 52 that forms an end wall 57. The second horizontal segment 48 forms both the first channel bottom wall 55 of the first channel 40 and a second channel top wall 59 of the second channel 42. The end wall 52 of the second channel 42 is an upper portion of the inward facing wall 54 and forms a hinge, as described later.

The first channel 40 facing inward forms the top part of the S-shaped cross-section, while the second channel 42 facing outward forms the bottom part of the S-shaped cross-section. Advantageously, both the first and second channels are substantially parallel to each other and are advantageously perpendicular to the wall 26 of the filter housing 18. But preferably, the bottom side of the second channel 42, formed by the top side of the end portion 44, is slightly inclined downward at an angle of 3° to 15° and more preferably at an angle of 5° to 10°. The angle and orientation make it easier for the flange 41 to slide out of the second channel 42 during removal of the cover assembly 21 from the opening of the air filter housing 18. The inwardly and downwardly inclined side 47 of the triangular end portion 44 is at an angle of about 35° to 55° to the vertical as shown in FIGS. 3-6, and more preferably to an angle of 40° to 50° and preferably to an angle of about 45°. This inclined side 47 makes it easier to insert the end portion 44 into the opening 28 in the air filter housing during use when the end portion 44 flexes inward at the hinge formed by the end wall 52 of the second channel 42. The end wall 52 forming that hinge advantageously has a radial thickness of 0.1 to 0.4 inches along the axial length of the end wall 52.

Referring to FIGS. 1-6, the transparent cover 22 has an outer periphery with a known thickness. The cover 22 can be flat as in FIGS. 5-6, or it can be curved as in FIGS. 2 and 7. The first channel 40 has sidewalls formed by first and second segments 46, 48 spaced apart a distance the same as or more than that known thickness at the closed end of the channel formed by first vertical segment or first end wall 50, so that the peripheral outer edge of the cover fits snuggly into the first channel.

Figure 3:
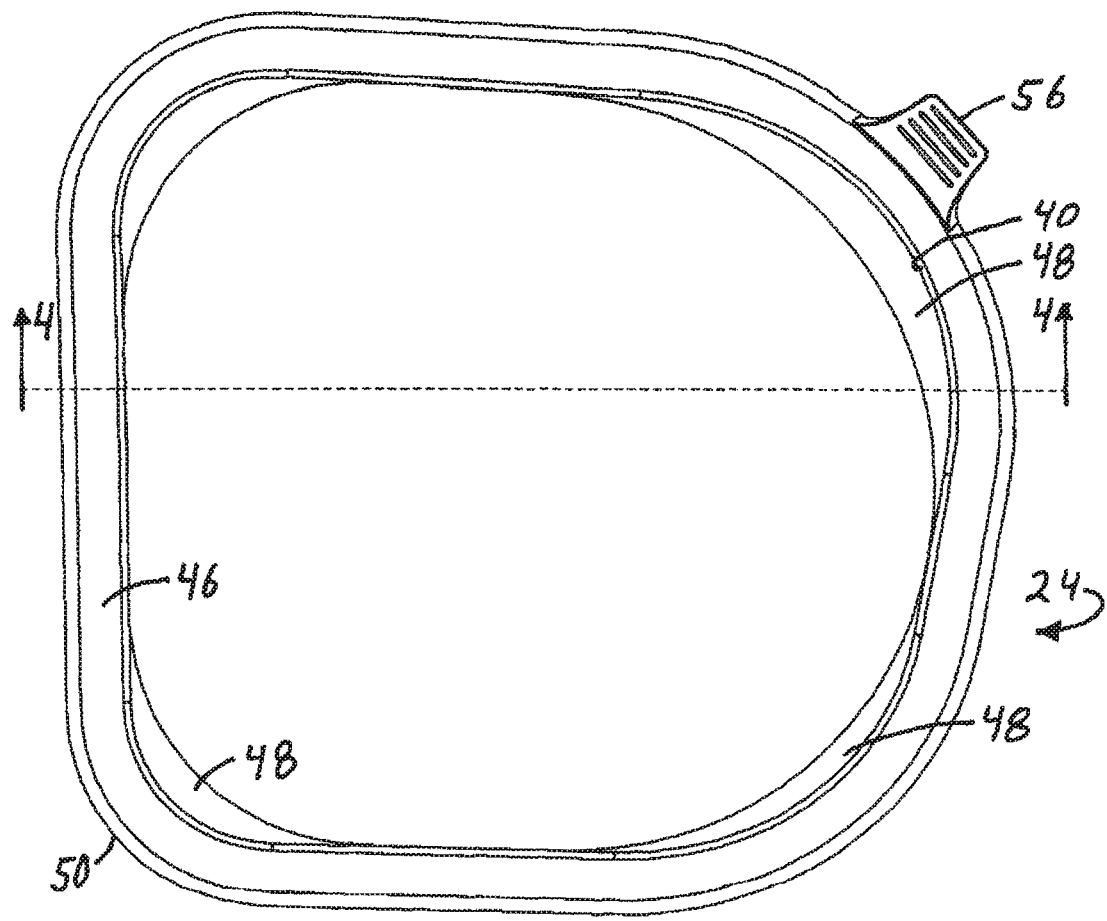
FIG. 3 is a top view of a gasket cover as shown in FIG. 1.

The outer periphery of the cover 22 is preferably larger than the inner periphery of the first channel 40, with the first and second horizontal segments 46, 48 overlapping the outer periphery of the cover 22. The inner periphery of the vertical wall 50 of the first channel 40 is advantageously slightly smaller than the outer periphery of the cover 22 so that the gasket 24 has to stretch slightly to fit around the periphery of the cover 22. This creates a complete airtight seal between the two components. However, the inner periphery of the wall 50 could be larger or smaller than the outer periphery of the cover 22, or selected to match the periphery of the cover 22. Advantageously, the spacing between the horizontal segments 46, 48 forming the walls of the first channel are about the same as or slightly smaller than the thickness of the cover. The horizontal segments 46, 48 forming the first channel 40 have an axial thickness along the longitudinal axis of about 0.1 inch. The segments 46, 48 forming the top and bottom walls of the first channel 40 may advantageously overlap the outer periphery of the cover 22 the same distance, with an overlap of 0.2 inch to 1.5 inch believed suitable, and an overlap of 0.2 inch to 1 inch preferred. If the overlap is shorter the cover 22 may slip out of the first channel 40. Because the shape of the air filter housing 18 will vary to fit the available space in the engine compartment, the gasket 24 may have the lower or second horizontal segment 48 extend inward more than the top or first horizontal segment 46, especially as the corners of a non-circular gasket and cover as seen in FIG. 3. Thus, the first horizontal segment 46 forming the top wall of the first channel 40 may have a uniform overlapping distance on the exterior side of the cover 22, while the second horizontal segment 48 forming the bottom wall of the first channel 40 may have a variable overlapping distance on the interior side of the cover 22.

The gasket 24 is advantageously made of a stretchable elastomeric material such as rubber or silicon, but other elastomeric materials are believed suitable, including polyurethane. A material with an elastic elongation of at least 5% along its entire length by manual stretching is believed suitable when the gasket is formed in a continuous loop. The gasket 24 is advantageously formed in a continuous loop or endless loop (i.e., no breaks). It is believed suitable to form the gasket in a single linear segment and join the ends by adhesives. A gasket forming a continuous loop is preferred over a single linear strip of extruded material with a small gap when wrapped around the outer periphery of the cover 22 because the single strip is not always retained on the cover 22 when the cover assembly 21 is removed from the housing, as one end of the gasket may peel off the cover. But a single length of gasket with two opposing ends, or a series of such lengths, is believed suitable, and such lengths can be held to the cover 21 by a tight fit, friction fit, or slight interference fit between the cover 22 and first channel 40, or by adhesives, or by other connection mechanisms that do not cause cracking of the cover 22 during its lifetime. A tab 56 extends from the gasket to facilitate removal of the cover assembly during use and may be integrally molded as a single, unitary part with the gasket 24.

For an endless gasket, the gasket 24 is placed around the cover to form a cover-gasket assembly 21, which is then removably fastened to the housing 18 over the opening 28. One edge of the cover 22 is placed into the first channel 40 and the gasket is worked around the periphery of the cover to insert the edge of the cover into the first channel 40 and stretch the gasket as needed. The end gasket assembly 21 advantageously has the outer edge of the cover 22 entirely enclosed in the first channel 40 of the gasket 24. Advantageously, the cover 22 can move within the first channel 40 once friction between the walls forming the channel and the cover is overcome. Thus, the cover 22 advantageously abuts the first vertical wall 50 and stretches the gasket slightly outward, as it is preferred the gasket be slightly stretched during installation of the cover 22 to form a better seal with the cover.

The gasket assembly 21 is held in the air filter housing using the inwardly extending housing flange 41 that extends from the wall 26, inward toward a center of the filter housing and toward the opposing flanges 41. The housing flange 41 extends inward a distance L and fits into the second channel 42 with some clearance between the inward end of the flange 41 and the end wall 52 of the second channel 42. The flange 41 on each housing wall 26 is preferably perpendicular to the wall 26 from which the flange extends, around the opening 28. The angle of inclination of the housing flange 41 relative to the housing wall 26 can vary, in which case the shape of the cover 22 will also vary. An inclination angle of 5° to 35° from the plane of the wall containing the flange is believed suitable. The filter housing 18 is advantageously rotomolded and the flange 41 may advantageously be formed as a continuous flange extending around curved corners joining two adjacent walls 26. But a flange 41 extending along each side wall 26 and not continuous around the corners of the housing is believed suitable. The flange 41 fits into the second channel 42 of the gasket in a snap-fit or snap-lock connection, with the triangular end portion 44 sliding inward over the distal end of the flange 41 to form the snap-fit or snap-lock connection.

Advantageously, the flange 41 has an inwardly extending length L that is the same as or slightly less than (i.e., 10%) the second channel is deep so as to seat the distal end of the flange adjacent to but spaced slightly apart from the back wall 52 of the second channel 42. The bottom wall of the second channel 42 is formed by the top 45 of the triangular end portion 44. The radial length of the top 45 is typically, but not always shorter than the second horizontal portion 48. The channel walls are configured so that the housing flange 41 can be inserted into and removed from the second channel, but the length of the second wall 48 may vary with the shape of the housing walls 26 which in turn may vary with the space available for the air box 18 under the hood. Thus, the relative radially inward widths or lengths of the top and bottom walls 48, 45 of the second channel 42 will vary. The second channel 42 advantageously has a top wall formed by second horizontal segment 48 that is about twice as long in radial length as the bottom wall of that channel 42 which is formed by the side 45, but that may vary. Advantageously, the thickness of the flange 41 is the same as the axial height of the second channel 42 at the end wall 52, so the opposing sides of the channel (45, 48) securely engage the opposing sides of the housing flange 41 at the end wall 52. The radially outward length of the second segment 48 is long enough to rest on the inwardly extending housing flange 41. The radially outward length of the top side 45 of the triangular portion 44 is advantageously shorter than that of second segment 48 and extends about ⅓ to over ½ the radial length of the housing flange 41 during use. The bottom side 45 of the triangular flange 44 extends over enough of the bottom portion of the housing flange 41 to form a snap lock that retains the cover assembly 21 with the air filter housing 18 during use.

Figure 5B:
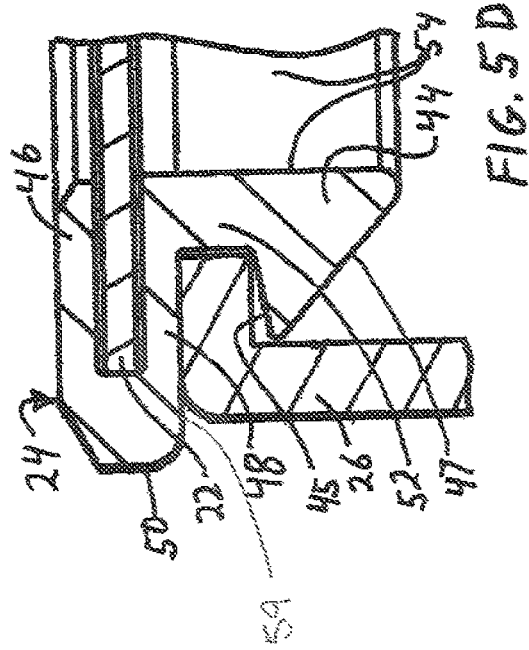
FIG. 5B is a sectional view showing the cover connected to an air filter housing having an inward extending flange along the top rim portion on the air filter housing with the cover ending at the housing wall's outer side.

Advantageously, the axial thickness of the periphery of the cover 22 enclosed by the first and second segments 46, 48 corresponds to a distance "d" as shown in FIG. 5B, measured from the top surface of the flange 41 to the top edge of the housing wall 26 so that the axial height or axial thickness of the cover assembly 21 at the periphery, is about the same as or slightly greater than the rim 43 (FIG. 5A) of the housing walls 26. Further, the outer periphery of the gasket end wall 50 when containing the cover 22 is such that the first segment 50 is adjacent but slightly spaced inward from the rim portion 43, when the engine is operating. It is believed undesirable to have the cover assembly 21 push outward against the rim portion 43 as that can bow the top of the air filter housing 18 or the cover assembly, or both. Because the cover 18 and gasket 24 are made of materials that may expand with temperature, it is desirable to allow enough clearance between the cover assembly 21 and the housing rim 43 to allow thermal expansion of the parts when the engine is running, and the engine and air intake system are under a closed hood of a motor vehicle. Advantageously, the cover assembly 21 does not expand outward enough to push against the top rim 43.

During use, the air box 18 and air tube 12 are connected to each other and mounted in a motor vehicle, typically under the hood by the engine. The opening 28 in the air filter housing is typically on an upper side of the air box 18. The gasket assembly 21 is placed over the opening 28 and the inwardly extending housing flange is fit into one side or corner of the cover assembly 21 and the cover assembly is then worked around its periphery to force the triangular end portion 44 of the gasket through the air filter housing's opening 28. The triangular end portion 44 has the inwardly inclined wall 47 long enough that it hits the top, inner end of the housing flange 41 and the inclined surface and the flexibility of the gasket helps the triangular end to pass the housing flange 41 and capture that flange in the second channel of the gasket. The end wall 52 of the second channel forms a hinge and allows the triangular portion of the gasket 24 to bend inward and slide over the inward end of the housing flange 41. When the housing flange 41 is seated in the second channel 42, the top, inclined wall 45 of the triangular portion 44 acts as a snap lock to retain the cover assembly engaged with the housing flange 41.

The cover assembly (i.e., cover 22 and gasket 24) allows viewing of the air filter to check it for blockage and whether any debris are retained in the air filter housing or on the filter. The cover assembly 21 may be removed by pulling upward on the tab 56 which extends from the gasket 24, and which preferably extends from one corner of the gasket. Advantageously, the pull tab 56 is molded as part of the gasket 24 so it is integrally molded at the same time as and from the same material as the gasket 24. Pulling upward on the tab 56 pulls the top portion of the gasket 24 upward and the downwardly inclined side 45 of the triangular portion 44 slides upward over the inner edge of the housing flange 41 adjacent the tab 56. The lower triangular portion 44 is then worked out around the peripheral edge of the housing until the housing flange is disengaged from the second channel and the cover assembly is free from the housing 18. Once the cover assembly 21 is removed, the filter may be removed through the opening 28 in the housing previously blocked by the cover assembly.

Figure 5C:
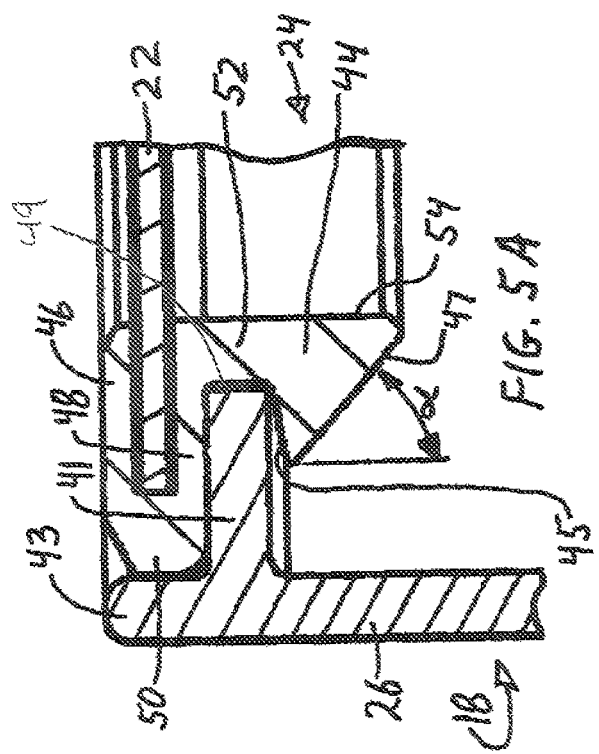
FIG. 5C is a sectional view showing the cover connected to an air filter housing having an inward extending flange along the top rim portion on the air filter housing with the cover ending inward of the housing wall's outer side.
Figure 5D:
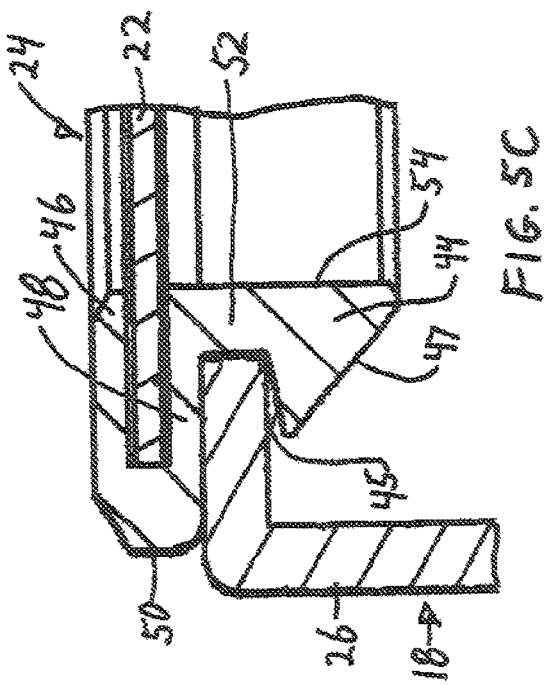
FIG. 5D is a sectional view showing the cover connected to an air filter housing having an inward extending flange along the top rim portion on the air filter housing with the cover ending outward of the housing wall's outer side.

As seen in FIGS. 5B to 5D, the air filter housing 18 may have no top rim 43 extending upward above the housing flange 41, so the housing's top rim is formed by the inwardly extending housing flange 41. In this configuration the cover 22 and gasket 24 may be sized so the outer periphery of the cover assembly 21 extends outward to the housing periphery formed by the walls 26 of the housing 18 (FIG. 5B), so the outer periphery is located inward of the walls 26 but still on the flange 41 (FIG. 5C), or so the outer periphery extends beyond the walls 26 as in FIG. 5D. Advantageously, the outer periphery of the cover assembly 21 is within about 0.1-0.3 inches of the outer periphery of the walls 26 of the housing 18 at ambient temperatures (ending before or beyond the walls), and may expand during use as the temperature under the hood increases, e.g., from engine heat. The configuration with the outer periphery of the cover assembly 21 extending beyond the walls 26 as in FIG. 5D, may advantageously omit the tab 56 if the cover assembly overhangs one of the walls 26 a distance sufficient for a user's fingers to grip the overhanging edge and remove the cover assembly from the housing.

Figure 6A:
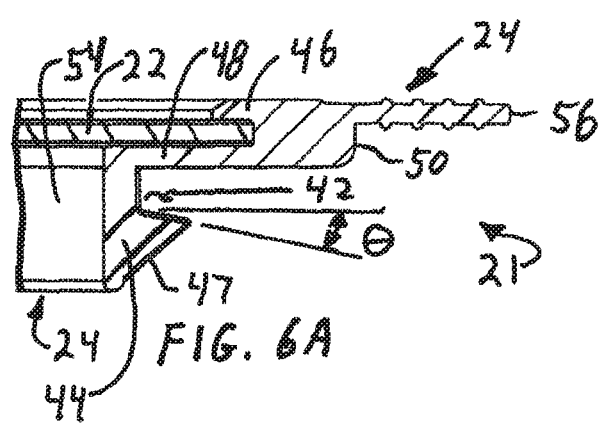
FIG. 6A is a sectional view showing the cover and a pull tab extending laterally outward.
Figure 6B:
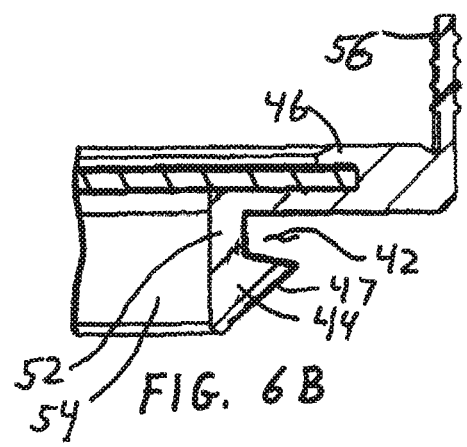
FIG. 6B is a sectional view showing the cover and a pull tab extending upward.

As seen in FIG. 6A, the tab 56 may extend laterally if there is no upwardly extending housing rim 43 or if there is a gap in such rim to accommodate the tab 56. Alternatively, the tab 56 may be upwardly inclined as in FIG. 69. The tab 56 advantageously has a textured surface and preferably has raised ribs to make it easier to grip the tab with fingers or plyers and pull to unlock the snap-lock formed by the housing flange 41 and the second channel and triangular portion 42, 44.

Figure 7:
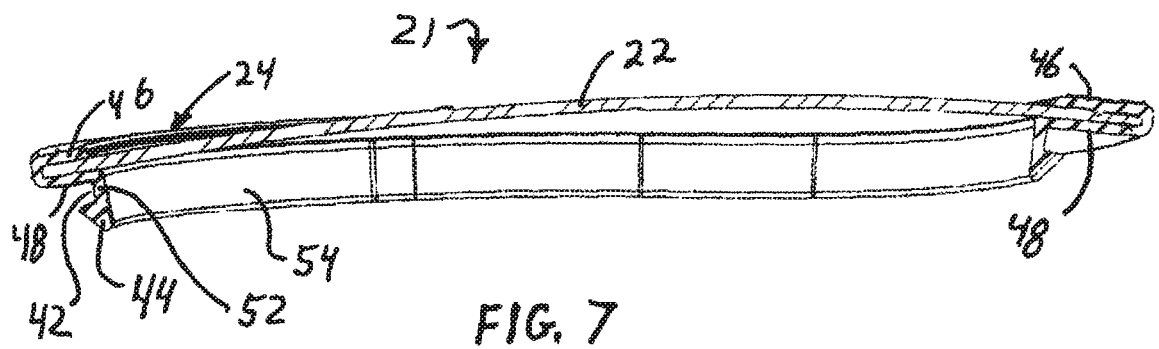
FIG. 7 is a sectional view of a curved cover and non-planar gasket.

Referring to FIGS. 2 and 7, the cover assembly may have a planar cover 22 or a curved cover 22 that is non-planer. Because the gasket 24 is flexible, the gasket can conform to the shape of the cover so the peripheral edge of the cover fits into the first channel 40. The inwardly extending flange must conform to the cover shape so it can mate with the second channel 42. The gasket 24 and cover 22 are preferably configured so the cover is overlapped the same distance from its outer periphery by the first and second portions 46, 48 of the first channel. But the overlap can vary as illustrated in FIG. 7. Depending on the configuration of the housing 28 and the inwardly extending flange 41, the outer periphery of the cover may overlap the flange 41 by different distances, and the flange 41 may extend different distances into the second channel 42. The flange 41 advantageously extends inward a distance of 0.3 to 1.5 inches with the channel 42 receiving that flange 41 overlapping the peripheral edge of the cover 22 the same distance or less. As noted earlier, the flange 41 is preferably continuous, but could be intermittent. The snap lock formed by the second channel 42 and the triangular end piece 44 are also preferably continuous and extend around at least a majority of the periphery of the housing at the flange 41, and more preferably extend around a substantial portion of the periphery of the housing at the flange 41. But the triangular end piece 44 could be intermittent and extend around a majority of the periphery of the housing at the flange 41.

During use, the cover assembly is drawn toward the inside of the housing by the negative air pressure in the air filter housing 18 as air is drawn through the filter 20. A pressure of about −5 inches of water is not unusual. It is desirable for the gasket 24 to seal against the housing flange 41 so all or substantially all the air enters the housing 18 through the air inlet(s) 34 which in the illustrated embodiment is on the bottom and one side of the housing. The gasket 24 advantageously seals the cover to the air housing sufficiently to block air from entering the air housing around the cover because such air is likely to be hot air from the engine area and less desirable for combustion by the engine and less prone to clogging the air filter and thus shortening the life of the air filter. It is thus believed undesirable, to have air leakage around a majority of the periphery of the housing, and it is preferable to have the cover assembly 21 seal against the housing flange 41 around a substantial portion of the housing's periphery if not the entire periphery so the volume of air entering the air filter housing 18 around the cover is negligible compared to the air entering through the air inlets 34 which are placed in desired locations to allow fresh, cooler and/or cleaner air to enter the air housing.

As seen in FIG. 1, one corner of the cover 22 may have a slight recess 58 located to coincide with the location of the pull tab 56 on the gasket 24. The recess 58 extends inward toward the longitudinal axis a short distance to make it easier for the pull tab 56 to remove the cover 22 from the gasket 24. The recess 58 advantageously does not extend inward enough for the cover to slip out of the first horizontal segment 46 and the first channel 40, even though the overlap of the first horizontal segment 46 may be less than the desired amount. It is believed that localized areas of less than desirable overlap of the segments 46, 48 will still maintain the cover in the first channel of the gasket.

The housing cover 22 is advantageously made of a clear, hard plastic such as polycarbonate, acrylic or other suitable plastic materials which are preferably transparent. The cover 22 could be made of an opaque material, including a hard rubber of even metal. The filter housing 18 is typically a rotational—molded container made of suitable polymer, such as polyethylene (including cross-linked polyethylene), PVC or vinyl, but other materials are believed suitable. The housing 18 could be injection molded, but that is believed less desirable than roto-molding. The filter 20 may have various shapes other than the pleated conical shape that is depicted. As seen in FIGS. 1 and 4-6, the outer peripheral edges of the gasket are preferably inclined to remove sharp corners that may more easily cut or tear. The gasket 24 is advantageously formed as a continuous ring with the cover 22 manually fit into the first channel 40, But the cover 22 could be inserted into a mold configured to form the gasket, and the first channel 40 could then be over-molded onto the cover 22, so that the first and second horizontal portions 46, 48 are overmolded onto the opposing sides of the periphery of the cover 22, and the first vertical segment 50 overmolded onto the peripheral, outward facing edge of the cover 22.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various shapes for the first and second channels 40, 42 and cover 44, Further, the various features of this invention can be used alone, or in varying combinations with each other and are not intended to be limited to the specific combination described herein. Thus, the invention is not to be limited by the illustrated embodiments.

What is claimed is:

1. A cover assembly for an opening in an air filter housing for a motor vehicle, the housing having housing walls forming an enclosure for containing an air filter, the housing walls forming an open top encircling a longitudinal axis extending through a center portion of the open top, the housing walls having and an inwardly extending housing flange extending around a periphery of that open top, the housing flange extending inward toward the longitudinal axis, the housing walls having a top edge, the cover assembly comprising:
    a cover having a shape configured to correspond to the shape of the housing flange and to rest against the housing flange along at least a majority of the peripheral length of the flange, the cover having opposing top and bottom sides and a peripheral edge;
    a gasket made of elastomeric material, comprising:
    a first channel opening toward the longitudinal axis and containing a portion of the top and bottom sides of the cover around the peripheral edge of the cover;
    a second channel below the first channel and opening in a direction away from the longitudinal axis, the second channel sized to receive the housing flange during use of the cover assembly, the second channel having second channel top and bottom walls with the second channel bottom wall inclined outward and downward at an angle of 3° to 15°, and further having a second channel end wall extending between the second channel top and bottom walls of the second channel;
    a lock portion having a top side formed by the second channel bottom wall and having an inclined side facing downward and outward and extending around a periphery of the gasket at the second channel bottom wall, the inclined side sized and located to hit an inward end of the housing flange around a periphery of the housing flange when the cover and gasket are moved along the longitudinal axis during use, the second channel end wall connecting to the lock portion to form a hinge that allows the lock portion to bend inward and outward relative to the longitudinal axis.

2. The cover assembly of claim 1, wherein the cover has at least a portion that is transparent, so the air filter may be seen through the cover during use of the cover.

3. The cover assembly of claim 2, wherein the first channel has a first channel top wall parallel to a first channel bottom wall and joined thereto by a first channel end wall, and wherein the second channel has a second channel top wall formed by a gasket segment forming the first channel bottom wall.

4. The cover assembly of claim 3 wherein the lock portion has a triangular cross-sectional shape with a third side extending downward from the second channel end wall and cooperating with the second channel end wall to form a cylindrical surface encircling the longitudinal axis during use.

5. The cover assembly of claim 2 wherein the gasket has an S-shaped cross section with the first and second channels opening in opposing directions, the first channel opening toward the longitudinal axis and the second channel opening in a direction away from the longitudinal axis.

6. The cover assembly of claim 2, wherein the first channel top wall and the second channel top wall are orthogonal to the longitudinal axis.

7. The cover assembly of claim 2, further comprising, a pull tab on the gasket large enough to be manually grabbed, for removing the cover from the air filter housing during use.

8. An air inlet assembly for a motor vehicle, comprising:
    an air filter housing having housing walls defining an enclosure for an air filter for a motor vehicle, the housing walls defining at least one air inlet opening and further defining a viewing opening having an outer periphery surrounded by a rim of the housing walls, the housing having a housing flange extending inward toward a longitudinal axis extending out of a center portion of the viewing opening, the housing flange extending around at least a majority of the viewing opening;
    a cover assembly having a cover configured to extend over the housing flange with an outer periphery of the cover enclosed in a first channel of a gasket, the first channel opening inward toward the longitudinal axis, the gasket having a second channel opening outward from the longitudinal axis and containing the housing flange so the cover and gasket block the viewing opening, the second channel having second channel top and bottom walls on opposing sides of the housing flange and joined by a second channel end wall, the gasket having a lock portion with an inclined side facing downward and also outward toward the housing and inclined at an angle sufficient to allow the inclined side of the lock portion to pass over the housing flange as the gasket bends inward at the second channel end wall when the gasket and cover move along the longitudinal axis toward the housing, the second channel bottom wall being angled downward away from the housing flange at an angle sufficient to allow the second channel bottom wall to pass upward over the housing flange when the cover assembly is manually removed from the viewing opening.

9. The air inlet assembly of claim 8, wherein the cover is transparent.

10. The air inlet assembly of claim 9, wherein the housing flange extends from the rim of the housing walls.

11. The air inlet assembly of claim 10, wherein a portion of the housing wall extends above the housing flange with the rim of the housing walls located a distance "d" above the housing flange, and wherein an axial thickness of the periphery of the cover assembly is the same as or less than that distance "d."

12. The cover assembly of claim 9, wherein the outer periphery of the gasket at a first channel end wall defined by the first channel does not extend beyond the rim of the housing defining the viewing opening.

13. The cover assembly of claim 9, wherein the outer periphery of the gasket at a first channel end wall defined by the first channel extends beyond the outer periphery housing walls at the juncture with the housing flange.

14. The air inlet assembly of claim 9, wherein the housing flange extends around a substantial portion of the periphery of the viewing opening.

15. The air inlet assembly of claim 9, further comprising an air filter in the air filter housing and visible through at least a portion of the cover.

16. The air inlet assembly of claim 14, further comprising an air filter in the air filter housing and visible through at least a portion of the cover.

17. The air inlet assembly of claim 16, further comprising an air intake tube connected to one of the air filter housing or the air filter.

18. The air inlet assembly of claim 15, further comprising an air intake tube connected to one of the air filter housing or the air filter.

19. An air inlet assembly for a motor vehicle, comprising:
an air filter housing having walls defining an enclosure for an air filter, the enclosure having at least one air inlet opening and a viewing opening with a rim around an outer periphery of the viewing opening, the housing having a housing flange extending inward toward a longitudinal axis extending out of the viewing opening, the housing flange extending around at least a majority of the viewing opening;
a cover assembly having a cover with at least a portion of the cover being transparent, the cover configured to extend over the housing flange and a gasket having a first channel facing the longitudinal axis and holding an outer periphery of the cover with a first channel bottom wall of the first channel interposed between the cover and the housing flange, the gasket having a second channel facing away from the longitudinal axis and containing the housing flange to hold the cover assembly to the housing flange, the second channel having second channel top and bottom walls on opposing sides of the housing flange and joined by a second channel end wall which bends inward and outward relative to the longitudinal axis to allow the gasket to pass the housing flange when an inclined side of the gasket that faces outward toward the housing and downward, slides over the housing flange as the gasket bends inward at the second channel end wall when the inclined side of the gasket is forced past the housing flange.

20. The air inlet assembly of claim 19 wherein the lower side second channel bottom wall of the second channel is angled downward away from the housing flange at an angle of 3° to 15°.

21. The air inlet assembly of claim 19, wherein the housing flange extends around a substantial portion of the viewing opening.

22. The air inlet assembly of claim 19, further comprising an air filter in the air filter housing and visible through at least a portion of the cover, and an air intake tube having a first end connected to one of the air filter housing or the air filter.

23. The air inlet assembly of claim 19, wherein the cover is curved in a direction along the longitudinal axis.

24. The air inlet assembly of claim 19, wherein the first channel is overmolded onto the outer periphery of the cover.

* * * * *